US012786041B2

(12) United States Patent
Radulescu-Banu et al.

(10) Patent No.: US 12,786,041 B2
(45) Date of Patent: Nov. 3, 2026

(54) PROVIDING DUAL TIMEOUTS FOR PACKET FORWARDING CONTROL PROTOCOL

(71) Applicant: Juniper Networks, Inc., Sunnyvale, CA (US)

(72) Inventors: Cristina Radulescu-Banu, Lexington, MA (US); John E. Ziegler, Westborough, MA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 119 days.

(21) Appl. No.: 19/072,382

(22) Filed: Mar. 6, 2025

(65) Prior Publication Data

US 2025/0365189 A1 Nov. 27, 2025

Related U.S. Application Data

(60) Provisional application No. 63/651,093, filed on May 23, 2024.

(51) Int. Cl.

| | |
|---|---|
| ***H04L 41/0604*** | (2022.01) |
| ***H04L 41/0668*** | (2022.01) |
| ***H04L 41/0806*** | (2022.01) |
| ***H04L 41/0894*** | (2022.01) |
| ***H04L 43/106*** | (2022.01) |

(52) U.S. Cl.
CPC ...... *H04L 41/0622* (2013.01); *H04L 41/0668* (2013.01); *H04L 41/0806* (2013.01); *H04L 41/0894* (2022.05); *H04L 43/106* (2013.01)

(58) Field of Classification Search
CPC ............. H04L 41/0622; H04L 41/0668; H04L 43/106
See application file for complete search history.

(56) References Cited

U.S. PATENT DOCUMENTS

2020/0136911 A1* 4/2020 Assali ................. H04L 41/0894
2023/0006889 A1* 1/2023 Thyagaturu ......... H04L 41/0806

* cited by examiner

*Primary Examiner* — Barbara B Anyan
(74) *Attorney, Agent, or Firm* — Harrity & Harrity, LLP

(57) ABSTRACT

A network device, with a user plane and a control plane, may establish a resiliency timeout and an association timeout for a packet forwarding control protocol utilized by the network device, and may detect expiration of the resiliency timeout. The network device may signal control plane or user plane applications based on the expiration of the resiliency timeout, and may cause the user plane to trigger a connected-pause state transition based on the expiration of the resiliency timeout.

20 Claims, 10 Drawing Sheets

100

In SGRP UP Mode

| Event | CP | UP |
|---|---|---|
| **Resiliency HB timeout** | Set UP to unhealthy Major<br>SGRP do nothing | Move to connected-paused<br>SGRP do nothing |
| **HB recovered** | Set UP Healthy<br>Switch to backup | Move to connected state<br>Send SGRP state report |
| **Association HB timeout** | Move to disconnected state<br>SGRP do nothing | Still in connected-paused<br>SGRP do nothing |
| **Disconnecting event (after association HB timeout)** | | |

In SGRP CP Mode

| Event | CP | UP |
|---|---|---|
| **Resiliency HB timeout** | Set UP to unhealthy Major<br>SGRP make UP backup | Move to connected-paused<br>SGRP make UP backup |
| **HB recovered** | Set UP Healthy<br>Evaluate UP role | Move to connected state<br>SGRP do nothing |
| **Association HB timeout** | Move to disconnected state<br>SGRP do nothing | Still in connected-paused<br>SGRP do nothing |

FIG. 1E

100

Configuration on both CP and UP

```
message-interval;          # message retry interval default is 3000 ms
message-retries;           # message retry default is 5

association-heartbeat-loss-count;   # default 1200
resiliency-heartbeat-loss-count;    # default 20
restoration-heartbeat-count;        # default 3
heartbeat interval;                 # default 1
```

FIG. 1F

PROVIDING DUAL TIMEOUTS FOR PACKET FORWARDING CONTROL PROTOCOL

CROSS-REFERENCE TO RELATED APPLICATION

This patent application claims priority to U.S. Provisional Patent Application No. 63/651,093, filed on May 23, 2024, and entitled "PROVIDING DUAL TIMEOUTS FOR PACKET FORWARDING CONTROL PROTOCOL." The disclosure of the prior Application is considered part of and is incorporated by reference into this patent application.

BACKGROUND

The packet forwarding control protocol (PFCP) is a Third Generation Partnership Project (3GPP) protocol used on an interface between a control plane function and a user plane function. PFCP is one of the main protocols introduced in the fifth generation (5G) next generation mobile core network (5GC), but it is also used in the fourth generation (4G) evolved packet core (EPC) to implement control and user plane separation (CUPS).

SUMMARY

Some implementations described herein relate to a method. The method may include establishing, by a network device with a user plane and a control plane, a resiliency timeout and an association timeout for a PFCP utilized by the network device. The method may include detecting expiration of the resiliency timeout, and signaling control plane or user plane applications based on the expiration of the resiliency timeout. The method may include causing the user plane to trigger a connected-pause state transition based on the expiration of the resiliency timeout.

Some implementations described herein relate to a network device. The network device may include one or more memories, one or more processors, a user plane, and a control plane. The one or more processors may be configured to establish a resiliency timeout and an association timeout for a PFCP utilized by the network device, and detect expiration of the resiliency timeout. The one or more processors may be configured to signal control plane or user plane applications based on the expiration of the resiliency timeout, and cause the user plane to trigger a connected-pause state transition based on the expiration of the resiliency timeout. The one or more processors may be configured to cause the control plane to trigger an unhealthy-major user plane state based on the expiration of the resiliency timeout.

Some implementations described herein relate to a non-transitory computer-readable medium that stores a set of instructions. The set of instructions, when executed by one or more processors of a network device with a control plane and a user plane, may cause the network device to establish a resiliency timeout and an association timeout for a PFCP utilized by the network device. The set of instructions, when executed by one or more processors of the network device, may cause the network device to detect expiration of the resiliency timeout, and signal control plane or user plane applications based on the expiration of the resiliency timeout. The set of instructions, when executed by one or more processors of the network device, may cause the network device to cause the user plane to trigger a connected-pause state transition based on the expiration of the resiliency timeout. The set of instructions, when executed by one or more processors of the network device, may cause the network device to selectively signal the user plane to transition to a connected state when heartbeats are restored before expiration of the association timeout, or signal the user plane to transition to a disconnected state when heartbeats are restored after expiration of the association timeout.

BRIEF DESCRIPTION OF THE DRAWINGS

FIGS. 1A-1F are diagrams of an example associated with providing dual timeouts for PFCP.

DETAILED DESCRIPTION

Figure 1A:
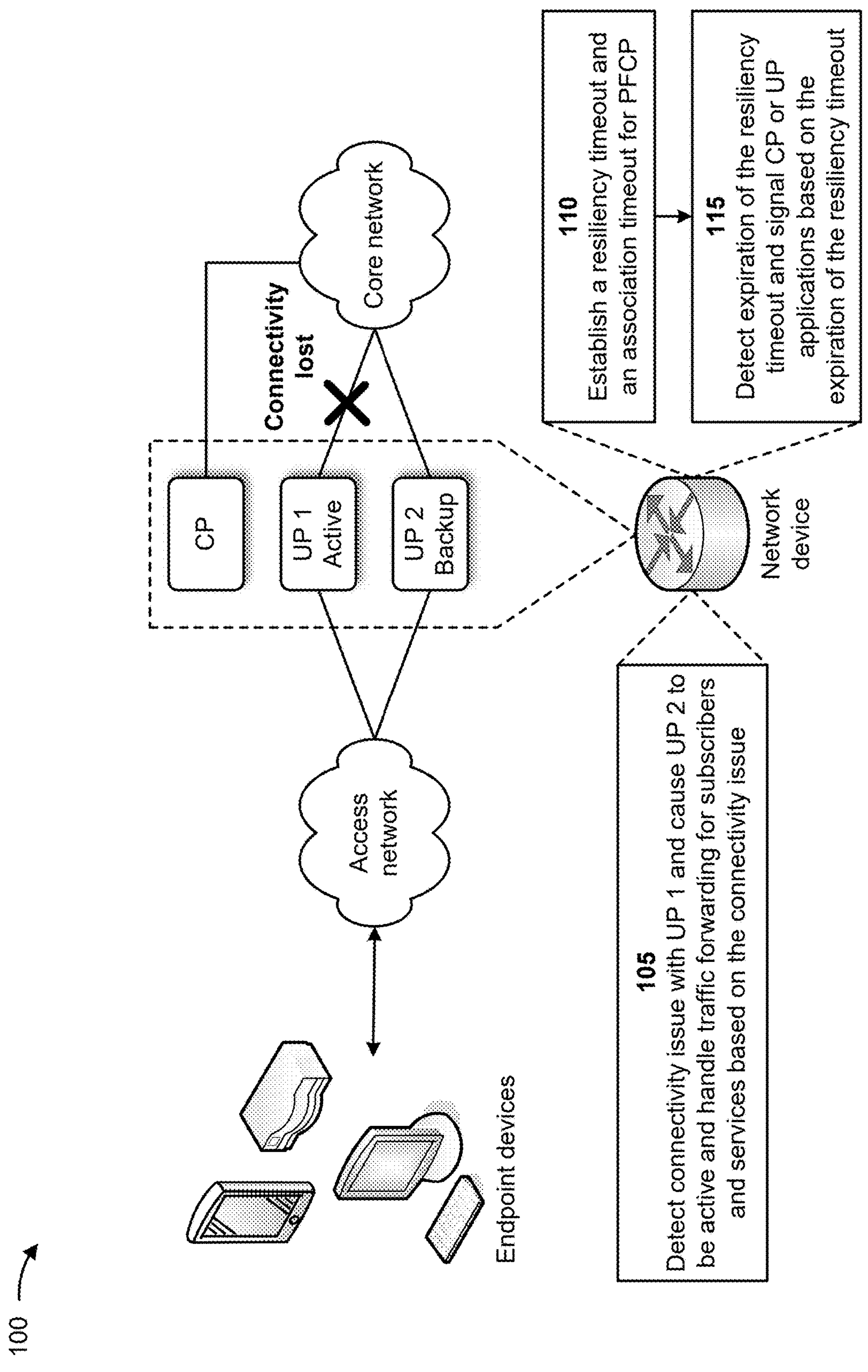

The following detailed description of example implementations refers to the accompanying drawings. The same reference numbers in different drawings may identify the same or similar elements.

PFCP and associated interfaces seek to formalize interactions between different types of functional elements used in the mobile core networks as deployed by most operators providing 4G, as well as 5G, services to mobile subscribers. The functional elements may include control plane (CP) functional elements that handle mostly signaling procedures (e.g., network attachment procedures, management of user plane paths, and delivery of lightweight services, such as short message service (SMS)). The functional elements may also include user plane (UP) functional elements that handle mostly packet forwarding based on rules set by the CP functional elements (e.g., packet forwarding for Internet protocol version 4 (IPv4), IP version 6 (IPv6), or Ethernet between various supported wireless access networks and a packet data network representing the Internet or an enterprise network). A network device, such as a broadband network gateway (BNG), may utilize PFCP and may provide an access point through which subscribers may connect to a broadband network (e.g., a mobile core network).

UP and/or CP connectivity situations may occur in the network device, such as a UP resiliency situation or a UP/CP restart or reboot situation. These two situations warrant different timeouts in the network device. The UP resiliency situation may require a short timeout (e.g., fifteen seconds) to drive subscriber group (SGRP) switchovers to a backup UP interface of the network device. Due to the cost of reconnecting all subscribers, the UP/CP restart/reboot situation may require a longer timeout (e.g., ten to fifteen minutes). PFCP only provides a single timeout for the network device for handling the UP resiliency situation and the UP/CP restart/reboot situation. Thus, the network device is unable to properly handle either the UP resiliency situation or the UP/CP restart/reboot situation, resulting in consumption of computing resources associated with unnecessarily restarting/rebooting the network device, failing to provide UP resiliency, and/or the like.

Thus, current techniques for handling UP and/or CP connectivity situations in a network device consume computing resources (e.g., processing resources, memory resources, communication resources, and/or the like), networking resources, and/or the like associated with delaying traffic transmission through the network device, losing traffic in the network device, handling lost traffic in the network device, preventing traffic transmission by customers, and/or the like.

Some implementations described herein relate to a network device that provides dual timeouts for PFCP. For example, a network device, with a user plane and a control plane, may establish a resiliency timeout and an association timeout for a packet forwarding control protocol utilized by the network device, and may detect expiration of the resiliency timeout. The network device may signal control plane or user plane applications based on the expiration of the resiliency timeout, and may cause the user plane to trigger a connected-pause state transition based on the expiration of the resiliency timeout. The network device may cause the control plane to trigger an unhealthy-major user plane state based on the expiration of the resiliency timeout.

In this way, the network device provides dual timeouts for PFCP. For example, the network device may add a resiliency timeout to PFCP in addition to an association timeout. The network device may detect expiration of the resiliency timeout and may signal CP or UP applications based on the expiration of the resiliency timeout. On the UP, the resiliency timeout may trigger a connected-pause state transition in the network device if the network device is in a connected state. If heartbeats are restored before expiration of the association timeout, the network device may signal the UP to transition to the connected state. If heartbeats are restored after expiration of the association timeout, the network device may signal the UP to transition to a disconnected state. On the CP, the resiliency timeout may trigger an unhealthy-major UP state in the network device (e.g., where an active UP interface is unavailable or disabled), which may force a switchover from the UP. If heartbeats are restored before expiration of the association timeout, the network device may signal the UP to transition to a healthy state. If heartbeats are restored after expiration of the association timeout, the network device may signal the UP to transition to the disconnected state. Heartbeat restoration may require a quantity of heartbeats in a row to be received before trying to reestablish a connection. Upon establishment of the connection, the network device may send a heartbeat restoration event to CP or UP applications.

Thus, the network device conserves computing resources, networking resources, and/or the like that would otherwise have been consumed by delaying traffic transmission through the network device, losing traffic in the network device, handling lost traffic in the network device, preventing traffic transmission by customers, and/or the like.

FIGS. 1A-1F are diagrams of an example 100 associated with providing dual timeouts for PFCP. As shown in FIGS. 1A-1F, the example 100 includes endpoint devices connected to an access network, and a core network connected to the access network via a network device. Further details of the endpoint devices, the access network, the core network, and the network device are provided elsewhere herein.

As shown in FIG. 1A, the network device may include a control plane (CP) component, a first user plane (UP 1) component, and a second user plane (UP 2) component. The first user plane component may be an active interface of the network device and may enable connectivity to the core network and the control plane component. The second user plane component may be a backup interface of the network device and may enable connectivity to the core network and the control plane component when the first user plane component is unavailable.

In some implementations, for core routing efficiency, the network device may group subscribers into subscriber groups (SGRPs). The network device may define an SGRP based on user plane interfaces, such as the first user plane component and the second user plane component. The network device may define one or more redundancy or backup interfaces for the SGRP. The SGRP may be active on only one user plane interface at a time, and subscribers may be serviced by the active user plane interface. All interfaces associated with the SGRP may move at the same time from an active user plane interface to a backup user plane interface. Each user plane interface may be associated with one or more SGRPs, and all subscribers on each user plane interface may belong to an SGRP. Subscriber network (e.g., IP) addresses may come from SGRP-defined address domains (e.g., made up of prefixes). The SGRP-defined address domains may be dynamically created based on RADIUS vendor-specific attributes (VSA), an SGRP name, and a routing instance. This enables policy to be applied per CUPS UP so that a routing policy may fit within any local variations. Address prefixes may be advertised differently on active and backup user plane interfaces. Switchovers may be controlled by either a control plane interface or a user plane interface. Route advertisement metrics may be changed upon switchover to enable policy to be applied per CUPS UP so that the routing policy may fit within any local variations.

In some implementations, the network device may provide user plane maintenance during a time when the user plane interface needs to be taken off-line (e.g., rebooted or restarted). During user plane maintenance, the network device may move subscribers to a dynamically-created backup user plane interface. Once the maintenance work is performed, the network device may bring the disabled user plane interface back on-line, and may move subscribers back to the reenabled user plane interface. The backup user plane interface may be freed up for future use.

In some implementations, the network device may provide subscriber high availability (HA) by configuring an SGRP with one or more resiliency interfaces. The network device may provide UP-controlled switchover SGRPs with a single resiliency interface and CP-controlled switchover SGRPs with one or more resiliency interfaces. For the UP-controlled switchover SGRPs, if the resiliency interface includes a resilient mechanism that makes one port active and one port standby, then a determination of an active UP may be decided by the network device.

As further shown in FIG. 1A, and by reference number 105, if the first user plane component reboots or loses connectivity to the control plane component (e.g., via the core network), the network device may cause the second user plane component to be active and handle traffic forwarding for subscribers and services. For example, the network device may detect a connectivity issue with the first user plane component and may cause the second user plane component to be active and handle traffic forwarding for subscribers and services based on the connectivity issue.

As further shown in FIG. 1A, and by reference number 110, the network device may establish a resiliency timeout and an association timeout for PFCP. For example, the network device may utilize PFCP, and the PFCP may include an association timeout. The network device may establish the resiliency timeout for the PFCP, in addition to the association timeout. In some implementations, user plane resiliency may require a short time period for the resiliency timeout to drive SGRP switchovers to a peer user plane. In one example, the resiliency timeout may be provided in seconds (e.g., fifteen seconds). In some implementations, the cost of reconnecting all subscribers (e.g., due to UP and/or CP failures and/or reboots) may require a longer time period for the association timeout. In one example, the association timeout may be provided in minutes (e.g., ten to fifteen minutes).

As further shown in FIG. 1A, and by reference number 115, the network device may detect expiration of the resiliency timeout and may signal control plane or user plane applications based on the expiration of the resiliency timeout. For example, if the network device fails to receive heartbeats during the time period of the resiliency timeout, the network device may detect the expiration of the resiliency timeout. In some implementations, the network device may signal applications of the control plane and/or the user plane based on the expiration of the resiliency timeout. For example, the network device may signal the control plane component, the first user plane component, and the second user plane component based on the expiration of the resiliency timeout.

Figure 1B:
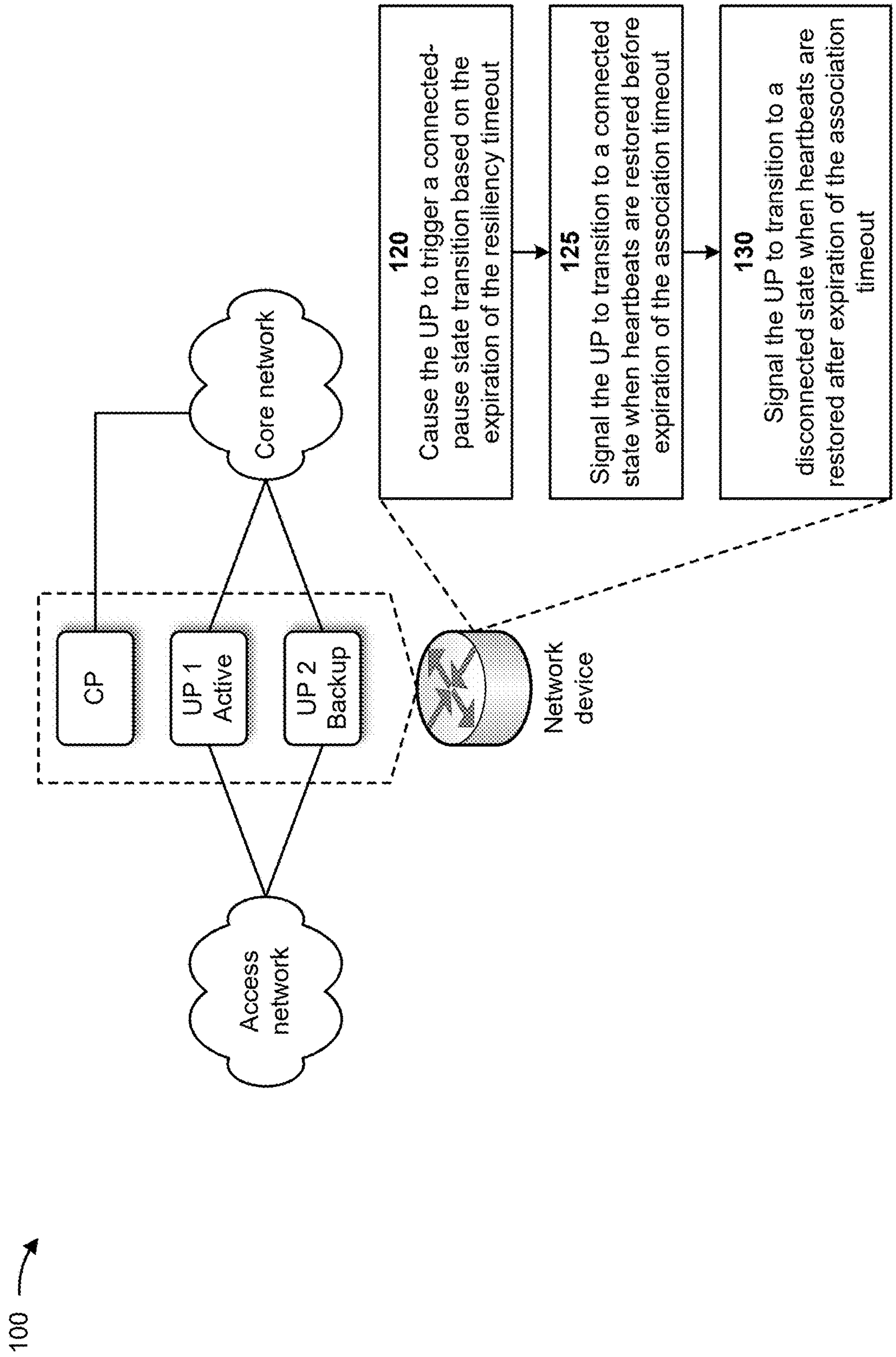

As shown in FIG. 1B, and by reference number 120, the network device may cause the user plane to trigger a connected-pause state transition based on the expiration of the resiliency timeout. For example, based on the expiration of the resiliency timeout, the network device may cause the user plane to trigger the connected-pause state transition in the network device if the network device is in a connected state. The connected-pause state transition may include an operational state of the user plane in which the network device pauses active packet forwarding activities while maintaining a connection status. Thus, when the network device detects that the resiliency timeout has expired, the network device may transition the user plane to a connected-pause state. During this state, the user plane may pause traffic forwarding operations but may remain connected to the control plane and other network components. The pause may enable the network device to address an issue without fully disconnecting, which can help in quickly resuming normal operations once the issue is resolved. The connected-pause state may manage temporary network disruptions or maintenance activities while minimizing an impact on overall network connectivity and performance. If an underlying issue (e.g., a loss of heartbeat signals or heartbeats) is resolved before the association timeout expires, the user plane may transition to a fully connected state.

As further shown in FIG. 1B, and by reference number 125, the network device may signal the user plane to transition to a connected state when heartbeats are restored before expiration of the association timeout. For example, when the network device is in the connected-pause state, the network device may continuously determine whether heartbeats are received by the network device before the expiration of the association timeout. In some implementations, the network device may receive heartbeats before the expiration of the association timeout. If heartbeats are received by the network device before the expiration of the association timeout, the network device may signal the user plane to transition to the connected state.

As further shown in FIG. 1B, and by reference number 130, the network device may signal the user plane to transition to a disconnected state when heartbeats are restored after expiration of the association timeout. For example, when the network device is in the connected-pause state, the network device may continuously determine whether heartbeats are received by the network device before the expiration of the association timeout. In some implementations, the network device may receive heartbeats after the expiration of the association timeout. If heartbeats are received by the network device after the expiration of the association timeout, the network device may signal the user plane to transition to the disconnected state.

Figure 1C:
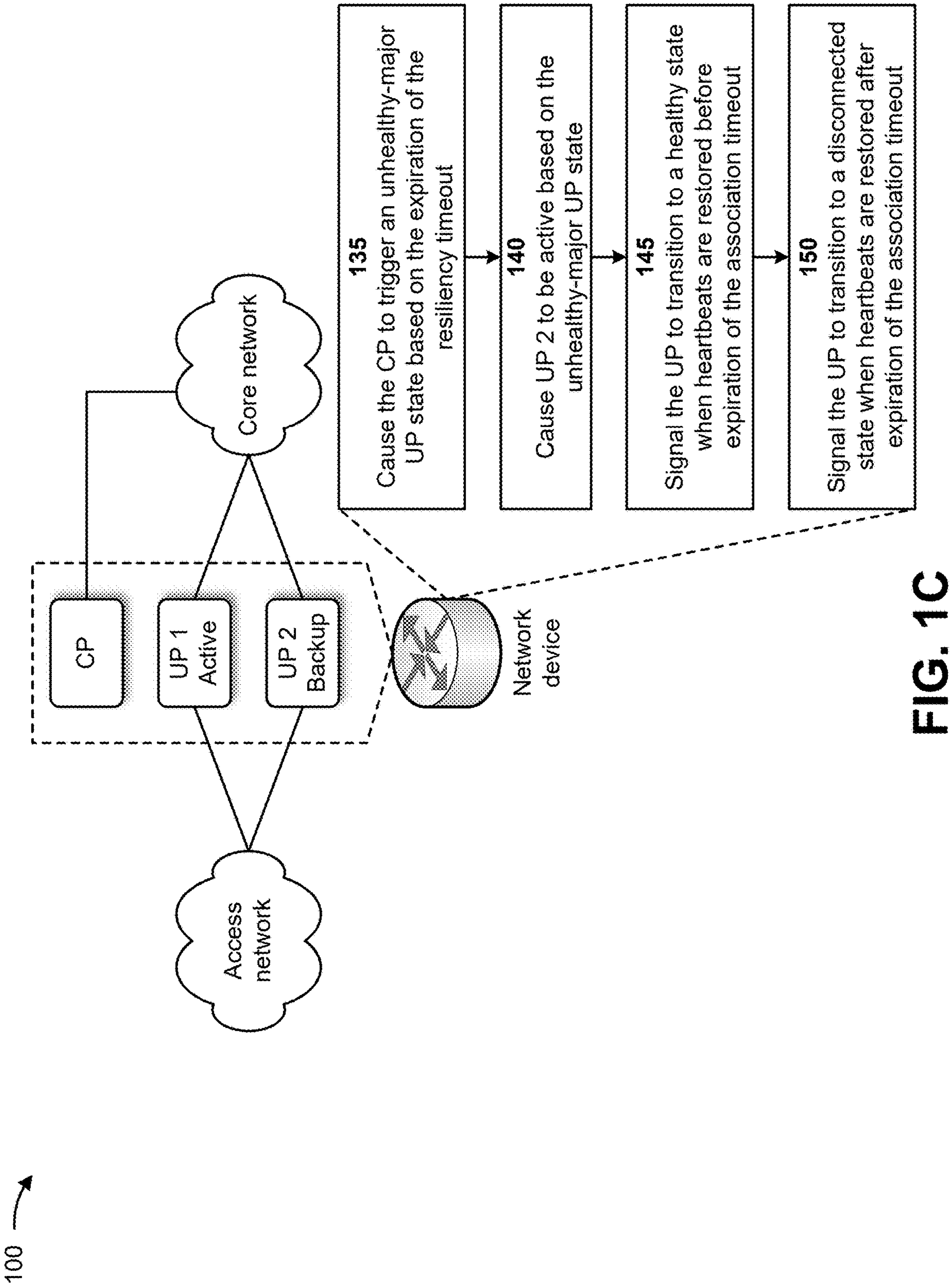

As shown in FIG. 1C, and by reference number 135, the network device may cause the control plane to trigger an unhealthy-major user plane state based on the expiration of the resiliency timeout. For example, based on the expiration of the resiliency timeout, the network device may cause the control plane to trigger the unhealthy-major user plane state. An unhealthy-major user plane state may include a condition where the user plane of the network device is not functioning correctly or has become severely degraded, impacting an ability of the user plane to forward packets and maintain connectivity. This state may indicate a significant problem with the user plane functionality, and may cause the network device to take corrective actions to mitigate an impact on network services. The corrective actions may include the network device activating a backup user plane to take over traffic forwarding responsibilities from the active user plane. The corrective actions may also include the network device signaling control plane or user plane applications about the unhealthy-major user plane state. This signaling may enable the applications to reroute traffic, adjust policies, initiate recovery procedures, and/or the like.

As further shown in FIG. 1C, and by reference number 140, the network device may cause the second user plane component to be active based on the unhealthy-major user plane state. For example, when the control plane triggers the unhealthy-major user plane state (e.g., indicating that an active user plane is unavailable or disabled), the network device may activate a backup user plane to take over traffic forwarding responsibilities from the active user plane. In one example, the network device may activate the second user plane component to take over traffic forwarding responsibilities from the first user plane component.

As further shown in FIG. 1C, and by reference number 145, the network device may signal the user plane to transition to a healthy state when heartbeats are restored before expiration of the association timeout. For example, when the network device is in the unhealthy-major user plane state, the network device may continuously determine whether heartbeats are received by the network device before the expiration of the association timeout. In some implementations, the network device may receive heartbeats before the expiration of the association timeout. If heartbeats are received by the network device before the expiration of the association timeout, the network device may signal the user plane to transition to a healthy state (e.g., a connected state).

As further shown in FIG. 1C, and by reference number 150, the network device may signal the user plane to transition to a disconnected state when heartbeats are restored after expiration of the association timeout. For example, when the network device is in the unhealthy-major user plane state, the network device may continuously determine whether heartbeats are received by the network device before the expiration of the association timeout. In some implementations, the network device may receive heartbeats after the expiration of the association timeout. If heartbeats are received by the network device after the expiration of the association timeout, the network device may signal the user plane to transition to the disconnected state.

Figure 1D:
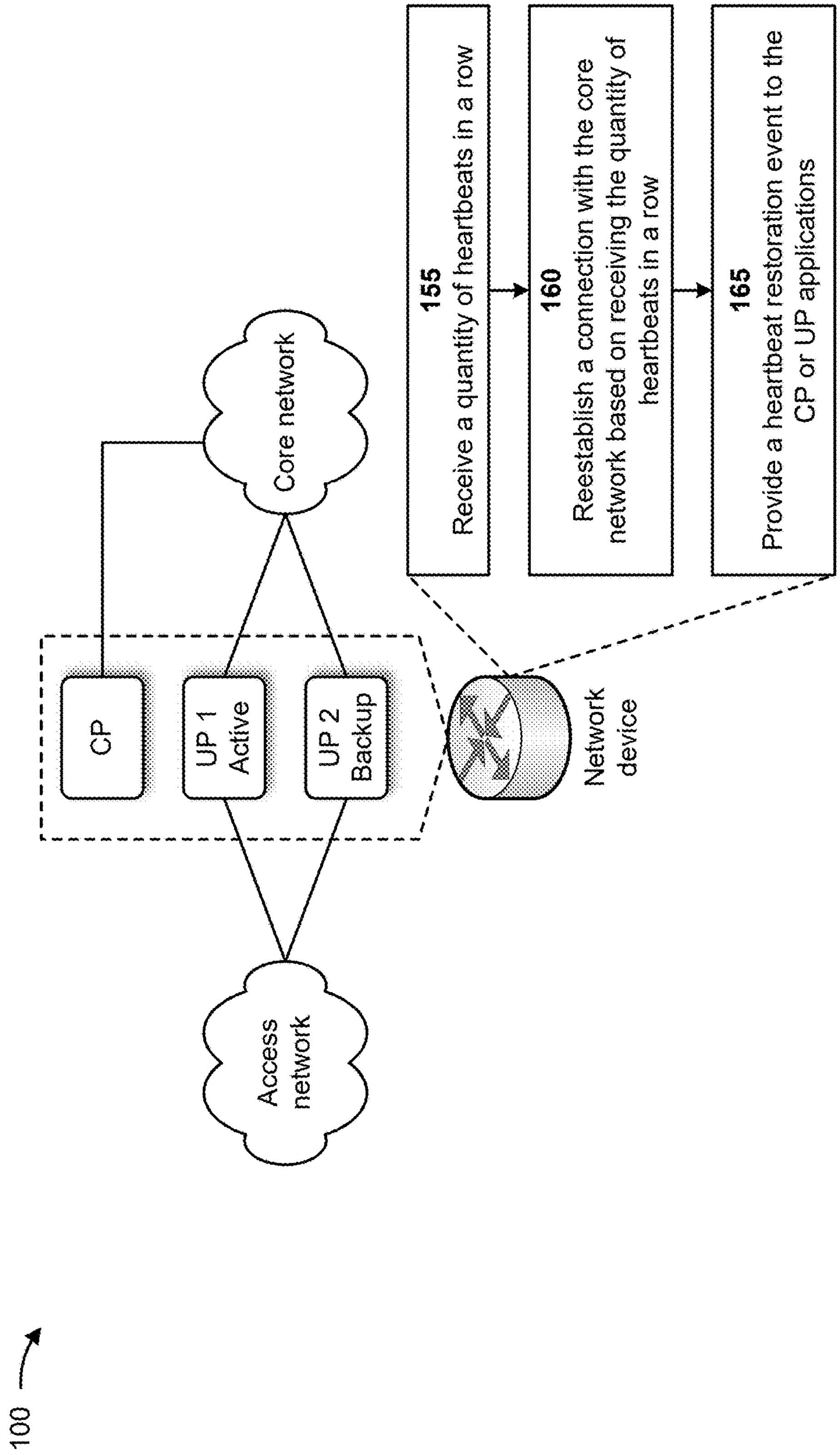

As shown in FIG. 1D, and by reference number 155, the network device may receive a quantity of heartbeats in a row. For example, heartbeat restoration (e.g., prior to expiration of the association timer) may require a quantity of heartbeats in a row to be received by the network device before trying to reestablish a connection for the user plane. When the network device receives heartbeats, the network device may determine whether the quantity of heartbeats in a row have been received. In some implementations, the network device may determine that the quantity of heartbeats in a row have been received. Alternatively, the network may determine that the quantity of heartbeats in a row have not been received. In such situations, the network device may not attempt to reestablish a connection for the user plane.

As further shown in FIG. 1D, and by reference number 160, the network device may reestablish a connection with the core network based on receiving the quantity of heartbeats in a row. For example, when the network device determines that the quantity of heartbeats in a row have been received, the network device may reestablish a connection between the user plane and the core network (e.g., and the control plane).

As further shown in FIG. 1D, and by reference number 165, the network device may provide a heartbeat restoration event to the control plane or user plane applications. For example, upon reestablishing the connection between the user plane and the core network (e.g., and the control plane), the network device may provide a heartbeat restoration event to the control plane and/or user plane applications. The heartbeat restoration event may indicate, to the control plane and/or user plane applications, that the user plane is connected to the control plane.

FIG. 1E depicts an example of implementation details for providing the dual timeouts for PFCP. As shown on the left side of FIG. 1E, in an SGRP UP mode, the network device may include a resiliency heartbeat timeout. The network device may detect expiration of the resiliency heartbeat timeout and may signal CP or UP applications based on the expiration of the resiliency heartbeat timeout. On the UP, the resiliency heartbeat timeout may trigger a connected-pause state transition in the network device if the network device is in a connected state and may cause nothing to be performed for the SGRP. If heartbeats are restored before expiration of the association timeout, the network device may signal the UP to transition to the connected state and may send an SGRP state report. If heartbeats are restored after expiration of the association timeout, the network device may maintain the UP in the connected-paused state and may cause nothing to be performed for the SGRP. On the CP, the resiliency heartbeat timeout may trigger an unhealthy-major UP state in the network device, which may force a switchover from the UP. The network device may cause nothing to be performed for the SGRP. If heartbeats are restored before expiration of the association timeout, the network device may signal the UP to transition to a healthy state and switch to a backup UP. If heartbeats are restored after expiration of the association timeout, the network device may signal the CP to transition to the disconnected state and may cause nothing to be performed for the SGRP.

As shown on the right side of FIG. 1E, in an SGRP CP mode, the network device may include a resiliency heartbeat timeout. The network device may detect expiration of the resiliency heartbeat timeout and may signal CP or UP applications based on the expiration of the resiliency heartbeat timeout. On the UP, the resiliency heartbeat timeout may trigger a connected-pause state transition in the network device if the network device is in a connected state and may cause the SGRP to utilize the UP backup. If heartbeats are restored before expiration of the association timeout, the network device may signal the UP to transition to the connected state and may cause nothing to be performed for the SGRP. If heartbeats are restored after expiration of the association timeout, the network device may maintain the UP in the connected-paused state and may cause nothing to be performed for the SGRP. On the CP, the resiliency heartbeat timeout may trigger an unhealthy-major UP state in the network device, which may force a switchover from the UP. The network device may cause the SGRP to utilize the UP backup. If heartbeats are restored before expiration of the association timeout, the network device may signal the UP to transition to a healthy state and switch to a backup UP. If heartbeats are restored after expiration of the association timeout, the network device may signal the CP to transition to the disconnected state and may cause nothing to be performed for the SGRP.

FIG. 1F depicts an example of a configuration on both the CP and the UP of the network device. As shown, the configuration may include a message interval with a message retry interval default value, a message retries entry with a message retry default value, an association heartbeat loss count with a default value, a resiliency heartbeat loss count with a default value, a restoration heartbeat count with a default value, and a heartbeat interval with a default value.

In this way, the network device provides dual timeouts for PFCP. For example, the network device may add a resiliency timeout to PFCP in addition to an association timeout. The network device may detect expiration of the resiliency timeout and may signal CP or UP applications based on the expiration of the resiliency timeout. On the UP, the resiliency timeout may trigger a connected-pause state transition in the network device if the network device is in a connected state. If heartbeats are restored before expiration of the association timeout, the network device may signal the UP to transition to the connected state. If heartbeats are restored after expiration of the association timeout, the network device may signal the UP to transition to a disconnected state. On the CP, the resiliency timeout may trigger an unhealthy-major UP state in the network device (e.g., where an active UP interface is unavailable or disabled), which may force a switchover from the UP. If heartbeats are restored before expiration of the association timeout, the network device may signal the UP to transition to a healthy state. If heartbeats are restored after expiration of the association timeout, the network device may signal the UP to transition to the disconnected state. Heartbeat restoration may require a quantity of heartbeats in a row to be received before trying to reestablish a connection. Upon establishment of the connection, the network device may send a heartbeat restoration event to CP or UP applications.

Thus, the network device conserves computing resources, networking resources, and/or the like that would otherwise have been consumed by delaying traffic transmission through the network device, losing traffic in the network device, handling lost traffic in the network device, preventing traffic transmission by customers, and/or the like.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices)

shown in FIGS. 1A-1F may perform one or more functions described as being performed by another set of devices shown in FIGS. 1A-1F.

Figure 2:
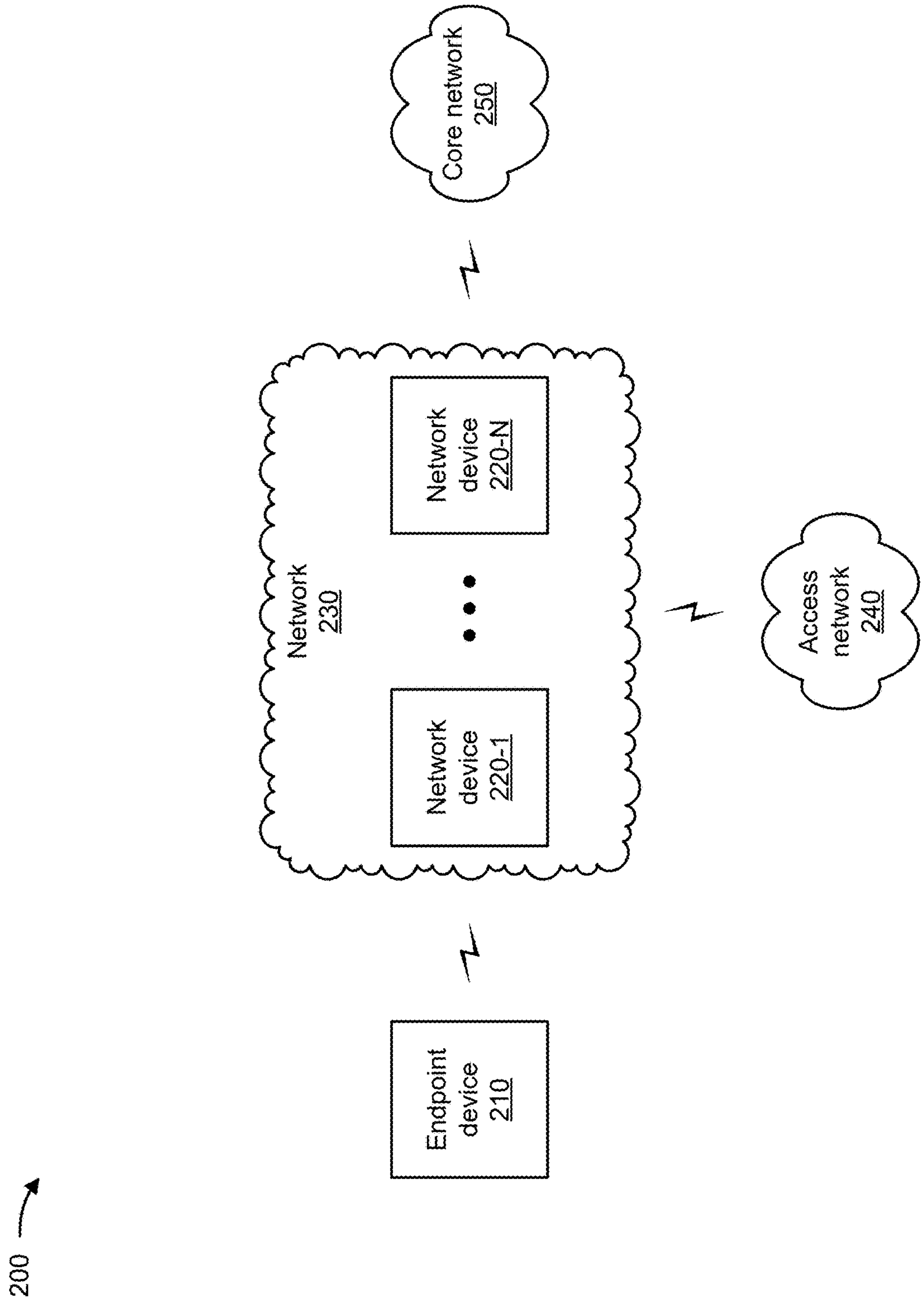
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include a an endpoint device 210, a group of network devices 220 (shown as network device 220-1 through network device 220-N), a network 230, an access network 240, and a core network 250. Devices of the environment 200 may interconnect via wired connections, wireless connections, or a combination of wired and wireless connections.

The endpoint device 210 includes one or more devices capable of receiving, generating, storing, processing, and/or providing information, such as information described herein. For example, the endpoint device 210 may include a mobile phone (e.g., a smart phone or a radiotelephone), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), a network device, or a similar type of device. In some implementations, the endpoint device 210 may receive network traffic from and/or may provide network traffic to other endpoint devices 210, via the network 230 (e.g., by routing packets using the network devices 220 as intermediaries).

The network device 220 includes one or more devices capable of receiving, processing, storing, routing, and/or providing traffic (e.g., a packet or other information or metadata) in a manner described herein. For example, the network device 220 may include a router, such as a label switching router (LSR), a label edge router (LER), an ingress router, an egress router, a provider router (e.g., a provider edge router or a provider core router), a virtual router, a route reflector, an area border router, or another type of router. Additionally, or alternatively, the network device 220 may include a gateway, a switch, a firewall, a hub, a bridge, a reverse proxy, a server (e.g., a proxy server, a cloud server, or a data center server), a load balancer, and/or a similar device. In some implementations, the network device 220 may be a physical device implemented within a housing, such as a chassis. In some implementations, the network device 220 may be a virtual device implemented by one or more computer devices of a cloud computing environment or a data center. In some implementations, a group of network devices 220 may be a group of data center nodes that are used to route traffic flow through the network 230.

The network 230 includes one or more wired and/or wireless networks. For example, the network 230 may include a packet switched network, a cellular network (e.g., a fifth generation (5G) network, a fourth generation (4G) network, such as a long-term evolution (LTE) network, a third generation (3G) network, and/or the like), a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The access network 240 may support, for example, a cellular radio access technology (RAT). The access network 240 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for user equipment. The access network 240 may transfer traffic between the endpoint devices 210 (e.g., using a cellular RAT), one or more base stations (e.g., using a wireless interface or a backhaul interface, such as a wired backhaul interface), and/or the core network 250. The access network 240 may provide one or more cells that cover geographic areas.

In some implementations, the access network 240 may perform scheduling and/or resource management for an endpoint device 210 covered by the access network 240 (e.g., an endpoint device 210 covered by a cell provided by the access network 240). In some implementations, the access network 240 may be controlled or coordinated by a network controller, which may perform load balancing, network-level configuration, and/or other operations. The network controller may communicate with the access network 240 via a wireless or wireline backhaul. In some implementations, the access network 240 may include a network controller, a self-organizing network (SON) module or component, or a similar module or component. In other words, the access network 240 may perform network control, scheduling, and/or network management functions (e.g., for uplink, downlink, and/or sidelink communications of endpoint devices 210 covered by the access network 240).

The core network 250 may include an example functional architecture in which systems and/or methods described herein may be implemented. For example, the core network 250 may include an example architecture of a 5G Next Generation (NG) core network included in a 5G wireless telecommunications system. In some implementations, the core network 250 may be implemented as a reference-point architecture and/or a 4G core network, among other examples. The core network 250 may include a number of functional elements, such as, for example, a network slice selection function (NSSF), a network exposure function (NEF), an authentication server function (AUSF), a unified data management (UDM) device, a policy control function (PCF), an application function (AF), an access and mobility management function (AMF), a session management function (SMF), a user plane function (UPF), a unified data repository (UDR), and/or the like. These functional elements may be communicatively connected via a message bus. Each of the functional elements may be implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
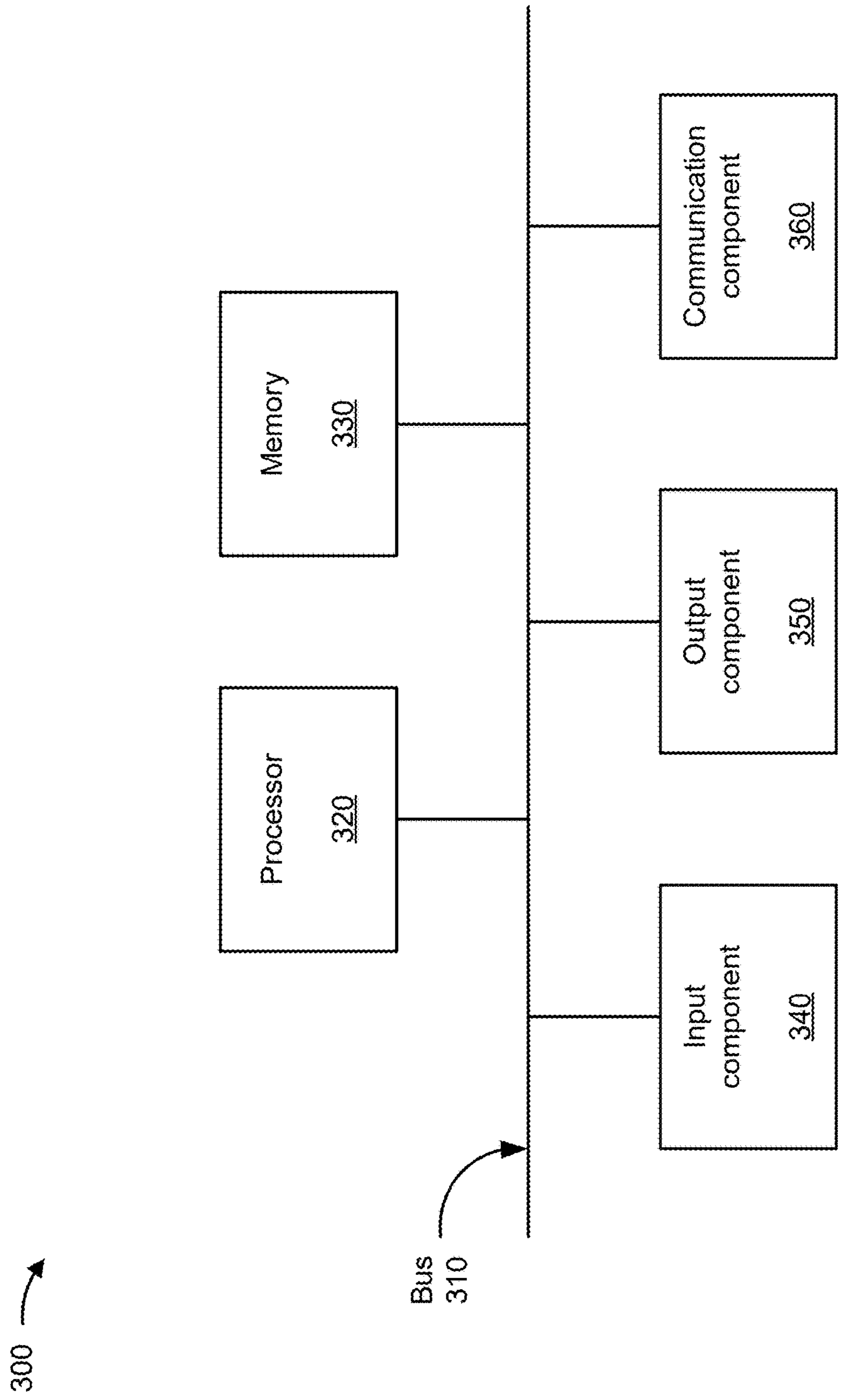
FIGS. 3 and 4 are diagrams of example components of one or more devices of FIG. 2.

FIG. 3 is a diagram of example components of one or more devices of FIG. 2. The example components may be included in a device 300, which may correspond to the endpoint device 210 and/or the network device 220. In some implementations, the endpoint device 210 and/or the network device 220 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit (CPU), a graphics processing unit (GPU), a microprocessor, a controller, a microcontroller, a digital signal processor (DSP), a field-programmable gate array (FPGA), an application-specific integrated circuit (ASIC), and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
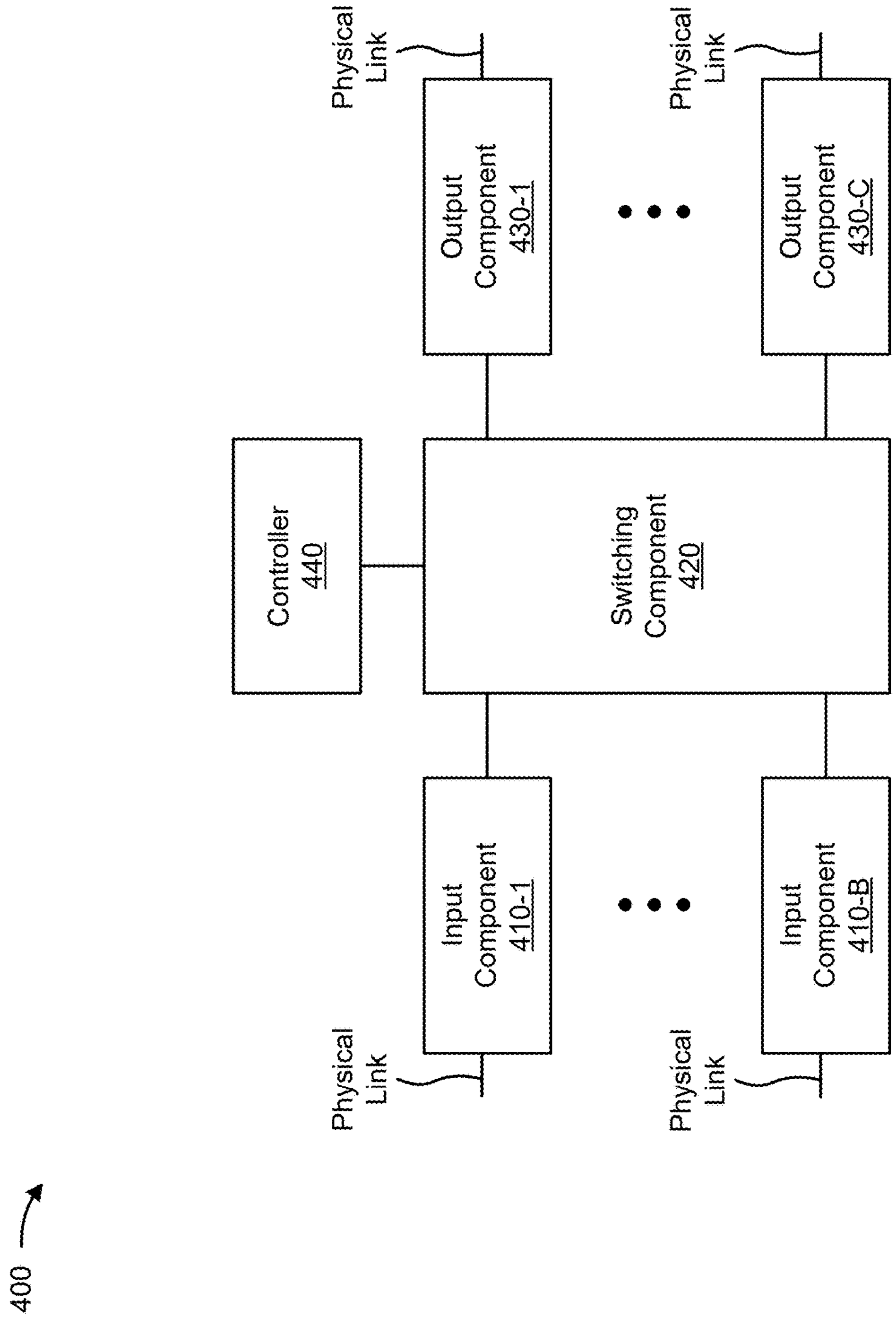

FIG. 4 is a diagram of example components of one or more devices of FIG. 2. The example components may be included in a device 400. The device 400 may correspond to the network device 220. In some implementations, the network device 220 may include one or more devices 400 and/or one or more components of the device 400. As shown in FIG. 4, the device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

The input component 410 may be one or more points of attachment for physical links and may be one or more points of entry for incoming traffic, such as packets. The input component 410 may process incoming traffic, such as by performing data link layer encapsulation or decapsulation. In some implementations, the input component 410 may transmit and/or receive packets. In some implementations, the input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, the device 400 may include one or more input components 410.

The switching component 420 may interconnect the input components 410 with the output components 430. In some implementations, the switching component 420 may be implemented via one or more crossbars, via busses, and/or with shared memories. The shared memories may act as temporary buffers to store packets from the input components 410 before the packets are eventually scheduled for delivery to the output components 430. In some implementations, the switching component 420 may enable the input components 410, the output components 430, and/or the controller 440 to communicate with one another.

The output component 430 may store packets and may schedule packets for transmission on output physical links. The output component 430 may support data link layer encapsulation or decapsulation, and/or a variety of higher-level protocols. In some implementations, the output component 430 may transmit packets and/or receive packets. In some implementations, the output component 430 may include an output line card that includes one or more packet processing components (e.g., in the form of integrated circuits), such as one or more IFCs, packet forwarding components, line card controller components, output ports, processors, memories, and/or output queues. In some implementations, the device 400 may include one or more output components 430. In some implementations, the input component 410 and the output component 430 may be implemented by the same set of components (e.g., and input/output component may be a combination of the input component 410 and the output component 430).

The controller 440 includes a processor in the form of, for example, a CPU, a GPU, an accelerated processing unit (APU), a microprocessor, a microcontroller, a DSP, an FPGA, an ASIC, and/or another type of processor. The processor is implemented in hardware, firmware, or a combination of hardware and software. In some implementations, the controller 440 may include one or more processors that can be programmed to perform a function.

In some implementations, the controller 440 may include a RAM, a ROM, and/or another type of dynamic or static storage device (e.g., a flash memory, a magnetic memory, an optical memory, etc.) that stores information and/or instructions for use by the controller 440.

In some implementations, the controller 440 may communicate with other devices, networks, and/or systems connected to the device 400 to exchange information regarding network topology. The controller 440 may create routing tables based on the network topology information, may create forwarding tables based on the routing tables, and may forward the forwarding tables to the input components 410 and/or output components 430. The input components 410 and/or the output components 430 may use the forwarding tables to perform route lookups for incoming and/or outgoing packets.

The controller 440 may perform one or more processes described herein. The controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with the controller 440 from another computer-readable medium or from another device via a communication component. When executed, software instructions stored in a memory and/or storage component associated with the controller 440 may cause the controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, the device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
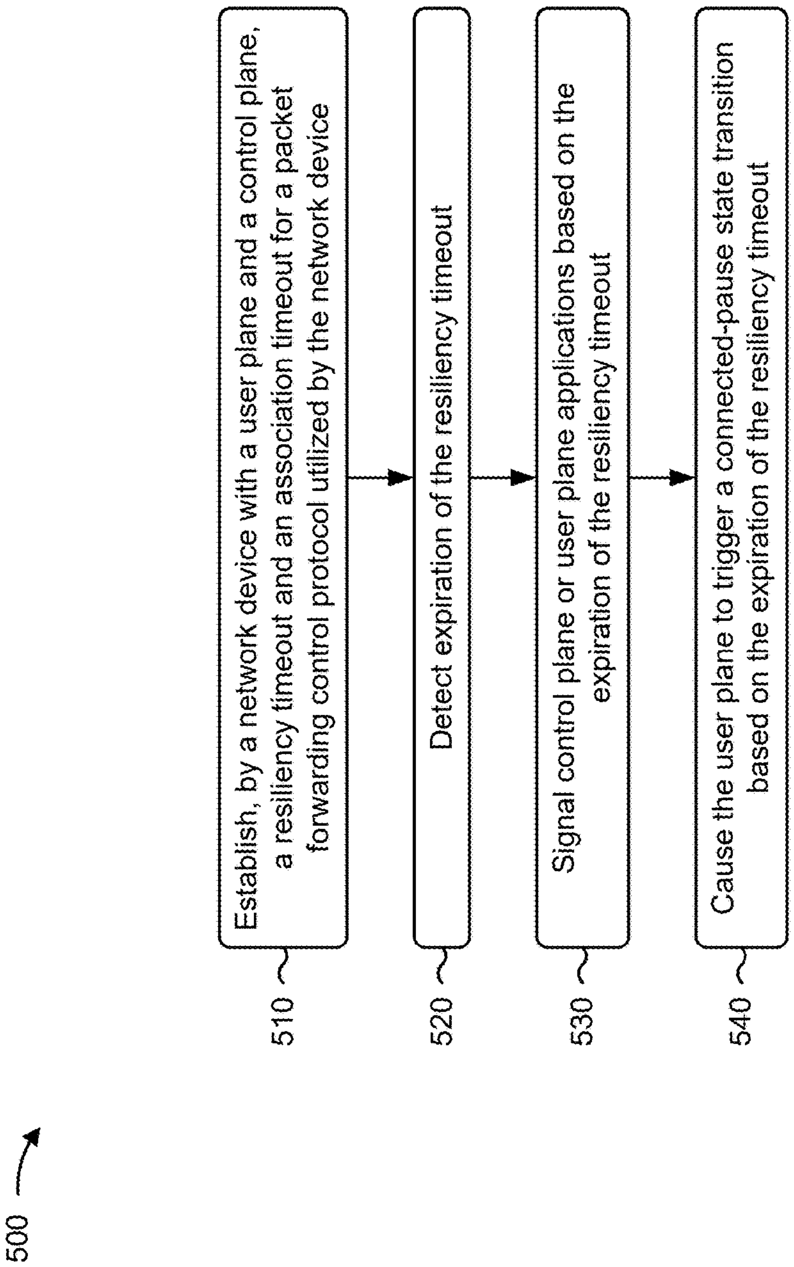
FIG. 5 is a flowchart of an example process for providing dual timeouts for PFCP.

FIG. 5 is a flowchart of an example process 500 for providing dual timeouts for PFCP. In some implementations, one or more process blocks of FIG. 5 may be performed by a network device (e.g., the network device 220). In some implementations, one or more process blocks of FIG. 5 may be performed by another device or a group of devices separate from or including the network device, such as an endpoint device (e.g., the endpoint device 210). Additionally, or alternatively, one or more process blocks of FIG. 5 may be performed by one or more components of the device 300, such as the processor 320, the memory 330, the input component 340, the output component 350, and/or the communication component 360. Additionally, or alternatively, one or more process blocks of FIG. 5 may be performed by one or more components of the device 400, such as the input component 410, the switching component 420, the output component 430, and/or the controller 440.

As shown in FIG. 5, process 500 may include establishing a resiliency timeout and an association timeout for a PFCP utilized by the network device (block 510). For example, the network device may establish, a control plane, a resiliency timeout and an association timeout for a PFCP utilized by the network device, as described above. In some implementations, the network device is a broadband network gateway connecting an access network and a core network.

As further shown in FIG. 5, process 500 may include detecting expiration of the resiliency timeout (block 520). For example, the network device may detect expiration of the resiliency timeout, as described above. In some implementations, detecting the expiration of the resiliency timeout includes detecting the expiration of the resiliency timeout based on maintenance of the user plane. In some implementations, detecting the expiration of the resiliency timeout includes detecting the expiration of the resiliency timeout based on subscriber high availability.

As further shown in FIG. 5, process 500 may include signaling control plane or user plane applications based on the expiration of the resiliency timeout (block 530). For example, the network device may signal control plane or user plane applications based on the expiration of the resiliency timeout, as described above.

As further shown in FIG. 5, process 500 may include causing a user plane to trigger a connected-pause state transition based on the expiration of the resiliency timeout (block 540). For example, the network device may cause a user plane to trigger a connected-pause state transition based on the expiration of the resiliency timeout, as described above.

In some implementations, process 500 includes signaling the user plane to transition to a connected state when heartbeats are restored before expiration of the association timeout. In some implementations, process 500 includes signaling the user plane to transition to a disconnected state when heartbeats are restored after expiration of the association timeout. In some implementations, process 500 includes causing a control plane to trigger an unhealthy-major user plane state based on the expiration of the resiliency timeout.

In some implementations, process 500 includes causing a backup user plane component to be active based on the unhealthy-major user plane state. In some implementations, process 500 includes signaling the user plane to transition to a healthy state when heartbeats are restored before expiration of the association timeout. In some implementations, process 500 includes signaling the user plane to transition to a disconnected state when heartbeats are restored after expiration of the association timeout.

In some implementations, process 500 includes receiving a quantity of heartbeats in a row. In some implementations, process 500 includes reestablishing a connection with a core network based on receiving the quantity of heartbeats in a row. In some implementations, process 500 includes providing a heartbeat restoration event to the control plane or user plane applications based on reestablishing the connection with the core network.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

establishing, by a network device with a user plane and a control plane, a resiliency timeout and an association timeout for a packet forwarding control protocol utilized by the network device;

detecting, by the network device, expiration of the resiliency timeout;

signaling, by the network device, control plane or user plane applications based on the expiration of the resiliency timeout; and causing, by the network device, the user plane to trigger a connected-pause state transition based on the expiration of the resiliency timeout.

2. The method of claim 1, further comprising:

signaling the user plane to transition to a connected state when heartbeats are restored before expiration of the association timeout.

3. The method of claim 1, further comprising:

signaling the user plane to transition to a disconnected state when heartbeats are restored after expiration of the association timeout.

4. The method of claim 1, further comprising:

causing the control plane to trigger an unhealthy-major user plane state based on the expiration of the resiliency timeout.

5. The method of claim 4, further comprising:

causing a backup user plane component to be active based on the unhealthy-major user plane state.

6. The method of claim 4, further comprising:

signaling the user plane to transition to a healthy state when heartbeats are restored before expiration of the association timeout.

7. The method of claim 4, further comprising:

signal the user plane to transition to a disconnected state when heartbeats are restored after expiration of the association timeout.

8. A network device, comprising:

one or more memories; and one or more processors to:

establish a resiliency timeout and an association timeout for a packet forwarding control protocol utilized by the network device;

detect expiration of the resiliency timeout;

signal control plane or user plane applications based on the expiration of the resiliency timeout;

cause a user plane of the network device to trigger a connected-pause state transition based on the expiration of the resiliency timeout; and cause a control plane of the network device to trigger an unhealthy-major user plane state based on the expiration of the resiliency timeout.

9. The network device of claim 8, wherein the one or more processors are further to:

receive a quantity of heartbeats in a row.

10. The network device of claim 9, wherein the one or more processors are further to:

reestablish a connection with a core network based on receiving the quantity of heartbeats in a row.

11. The network device of claim 10, wherein the one or more processors are further to:

provide a heartbeat restoration event to the control plane or user plane applications based on reestablishing the connection with the core network.

12. The network device of claim 8, wherein the network device is a broadband network gateway connecting an access network and a core network.

13. The network device of claim 8, wherein the one or more processors, to detect the expiration of the resiliency timeout, are to:

detect the expiration of the resiliency timeout based on maintenance of the user plane.

14. The network device of claim 8, wherein the one or more processors, to detect the expiration of the resiliency timeout, are to:

detect the expiration of the resiliency timeout based on subscriber high availability.

15. A non-transitory computer-readable medium storing a set of instructions, the set of instructions comprising:

one or more instructions that, when executed by one or more processors of a network device with a user plane and a control plane, cause the network device to:

establish a resiliency timeout and an association timeout for a packet forwarding control protocol utilized by the network device;

detect expiration of the resiliency timeout;

signal control plane or user plane applications based on the expiration of the resiliency timeout;

cause the user plane to trigger a connected-pause state transition based on the expiration of the resiliency timeout; and selectively:

signal the user plane to transition to a connected state when heartbeats are restored before expiration of the association timeout, or signal the user plane to transition to a disconnected state when heartbeats are restored after expiration of the association timeout.

16. The non-transitory computer-readable medium of claim 15, wherein the one or more instructions further cause the network device to:

cause the control plane to trigger an unhealthy-major user plane state based on the expiration of the resiliency timeout; and cause a backup user plane component to be active based on the unhealthy-major user plane state.

17. The non-transitory computer-readable medium of claim 15, wherein the one or more instructions further cause the network device to:

receive a quantity of heartbeats in a row.

18. The non-transitory computer-readable medium of claim 17, wherein the one or more instructions further cause the network device to:

reestablish a connection with a core network based on receiving the quantity of heartbeats in a row; and provide a heartbeat restoration event to the control plane or user plane applications based on reestablishing the connection with the core network.

19. The non-transitory computer-readable medium of claim 15, wherein the one or more instructions, that cause the network device to detect the expiration of the resiliency timeout, cause the network device to:

detect the expiration of the resiliency timeout based on maintenance of the user plane.

20. The non-transitory computer-readable medium of claim 15, wherein the one or more instructions, that cause the network device to detect the expiration of the resiliency timeout, cause the network device to:

detect the expiration of the resiliency timeout based on subscriber high availability.

* * * * *